July 21, 1970   W. A. NAGEL   3,521,062
MULTIDETECTOR NEUTRON LOGGING TECHNIQUE
Filed Aug. 28, 1967   3 Sheets-Sheet 1

INVENTOR.
Walter A. Nagel
BY John P. Sinnott
ATTORNEY

United States Patent Office 3,521,062
Patented July 21, 1970

3,521,062
MULTIDETECTOR NEUTRON LOGGING TECHNIQUE
Walter A. Nagel, Houston, Tex., assignor to Schlumberger Technology Corporation, New York, N.Y., a corporation of Texas
Filed Aug. 28, 1967, Ser. No. 663,596
Int. Cl. G01v 5/00; G01t 3/00
U.S. Cl. 250—83.1                 7 Claims

ABSTRACT OF THE DISCLOSURE

One embodiment of the invention provides a sidewall borehole tool for porosity logging that comprises short-spaced and long-spaced neutron detectors. The detectors straddle a chemical neutron source that is mounted eccentrically within a fast-neutron shield of copper in order to abut the side of the borehole. A neutron moderator, moreover, is interposed between the source and the long-spaced neutron detector in order to improve formation porosity resolution.

BACKGROUND OF THE INVENTION

Field of the invention

This invention relates to borehole logging apparatus and more particularly to equipment for measuring the porosity of the earth formation surrounding a borehole through neutron diffusion techniques, and the like.

DESCRIPTION OF THE PRIOR ART

Frequently, earth formation porosity is indicative of the oil-bearing potential of the strata traversed by a borehole; the more porous formations, in general, providing greater possibilities for economically significant oil production than those of lesser porosity. Thus, tools that can be drawn through a borehole to measure accurately the porosity of adjacent formations are of substantial interest to the oil industry.

Drilling techniques, however, introduce physical conditions within the borehole that make accurate porosity measurements extremely difficult. Typical of these techniques is the insertion of steel pipe to prevent the borehole from caving in. Often an irregular layer of cement is poured between the steel pipe and the borehole wall in order to prevent fluid communication between the oil production horizon and other earth formation strata. Naturally, the cement and the pipe are formidable barriers to formation porosity measurements.

Various tools have been suggested to measure porosity in terms of the absorption and diffusion of neutrons within the formation. Usually, it was believed that the influence of these and other "borehole effects" were minimized and porosity measurement accuracy was enhanced with increasing separation between the neutron source and the neutron detection equipment within the tool. The statistical validity of these proposed neutron measurements decreases, however, with increased source-to-detector spacing because the detector count rate declines very rapidly with increasing distance from the neutron source, and thereby undermines the basis for evaluating the formation porosity.

In the prior art, other tools have been proposed that emit pulses of neutrons in order to measure formation porosity as a function of the decline in the neutron population with the passage of time. These tools, however, require elaborate equipment for controlling the pulsed neutron source and the operation of the neutron detector during the detection intervals. The neutron sources in these tools, usually emit neutrons that have energies of 14 mev. (million electron volts) which produce a detector count rate that is not solely a function of formation porosity, but also depends strongly on the formation mineral composition or matrix, and the salinity of the formation fluid.

Thus, it is an object of the invention to provide an improved borehole logging tool for measuring formation porosity.

It is still another object of the invention to provide an improved apparatus for measuring formation porosity through borehole casing material.

It is a further object of the invention to provide an improved tool for measuring formation porosity that is not severely influenced by the formation matrix and fluid salinity.

SUMMARY

It has been found that the sensitivity to formation porosity is greatest when the irradiating neutrons have an average energy of about 5 mev., for example, plutonium-beryllium and americium-beryllum neutron sources emit neutrons with approximately this energy. In accordance with the invention, borehole effects are further reduced by straddling one of these neutron sources with a short-spaced detector and a long-spaced detector on opposite sides of the source. In this arrangement, the long-spaced detector is separated from the source by a distance at least as great as the length of the short-spaced detector. The response characteristics are improved, moreover, by interposing between the source and the long-spaced detector a material such as polyethylene which slows down, or moderates, the neutrons.

By placing the long- and short-spaced detectors on opposite sides of the neutron source, the perturbing effect of one detector on the other is eliminated. In particular, this perturbation occurs because the near detector reduces the far detector response appreciably, since it acts as a strong neutron sink, or absorber. The effect of the far detector on the near detector is small by comparison. In accordance with the invention, moreover, placing the detectors on opposite sides of the source permits the maximum amount of shielding and moderating material to be interposed between the source and each detector, and thereby further improves the tool response characteristics by more efficiently suppressing direct neutron radiation from the source.

The novel features of the present invention are set forth with particularity in the appended claims The present invention, both as to its organization and manner of operation, together with further objects and advantages thereof, may best be understood by reference to the following description taken in conjunction with the accompanying drawing.

DESCRIPTION OF THE PREFERRED EMBODIMENTS

Figure 1:
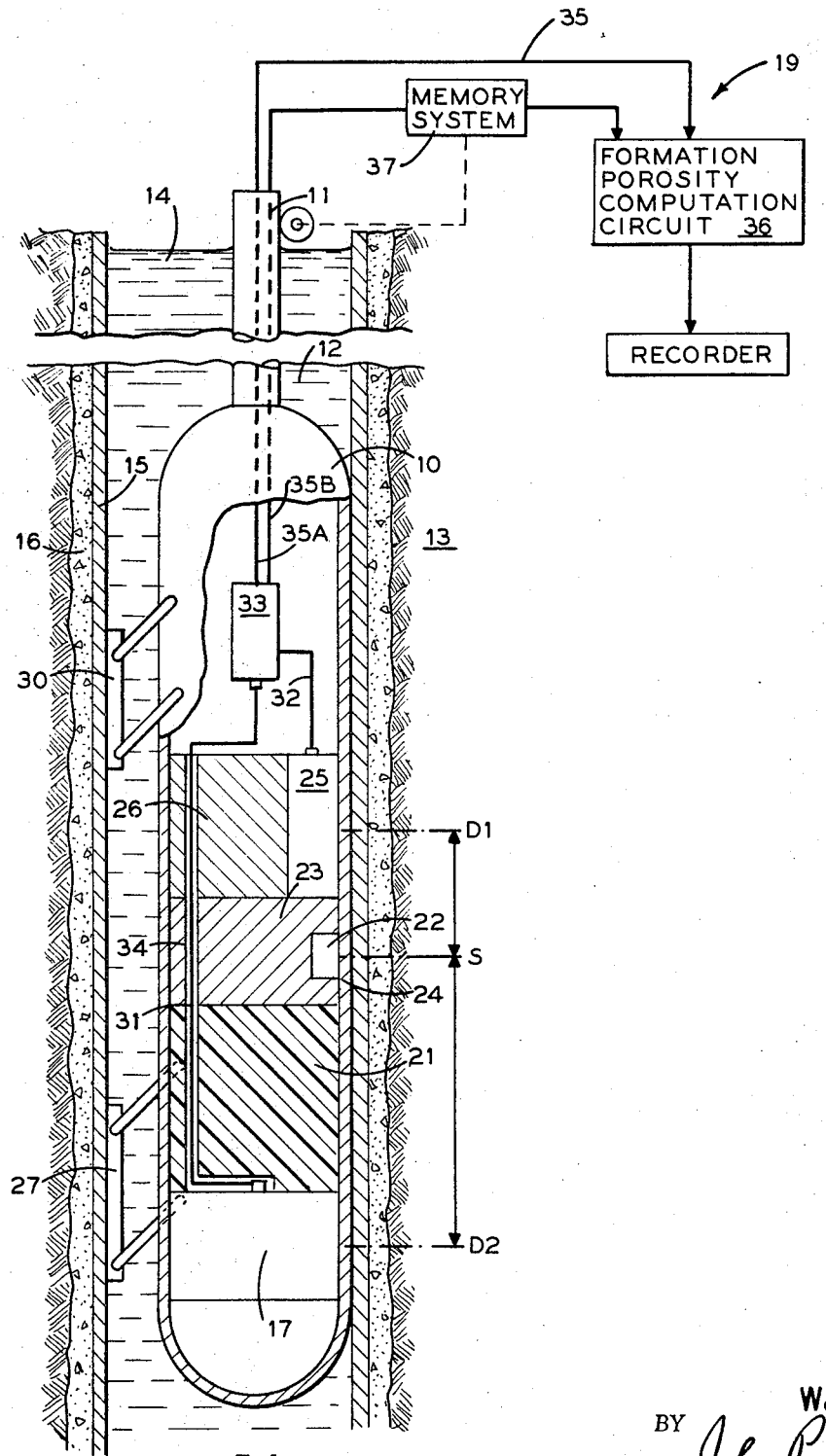
FIG. 1 is a schematic diagram of one embodiment of a well logging tool in accordance with the invention, showing the electrical circuits associated therewith in block diagram form.

An illustrative embodiment of a practical apparatus for measuring formation porosity in accordance with the invention is shown in FIG. 1 of the drawing.

A fluid-tight pressure resistant housing 10 is suspended by an armored cable 11 in a borehole 12. As will be described later in detail, the cable 11 may comprise a group of insulated conductors (not individually shown) that electrically connect the equipment within the housing 10 with surface apparatus 19. A winch (not shown) located at the surface of the earth is utilized to lower and raise the housing 10 in the borehole in the customary manner to traverse earth formations 13. The borehole 12 may be dry or may be filled with water-base or oil-base drilling mud 14, as shown. The borehole 12 may be uncased or it may be lined with one or more strings of iron casing 15 surrounded by irregular annuli of concrete 16, also as shown.

Supported in the lowermost end of the housing 10 is a neutron detector 17. Typically, the neutron detector 17 may consist of helium-3 ($He^3$) filling gas at a pressure of four atmospheres contained within a hollow cylindrical cathode. The detector 17 also may have an anode wire (not shown) disposed within and insulated from the cathode. Neutrons scattered back to the detector 17 from the formation 13 collide with the $He^3$ nuclei in the gas and initiate nuclear reactions. Each of these nuclear reactions causes some of the filling gas to ionize and produce a pulse in the detector output electrodes that is proportional to the energy of the detected neutrons.

The diameter of the detector 17 is substantially coextensive with the inside diameter of the housing 10. Thus, the detector 17 accommodates the largest possible volume of filling gas obtainable within the constraints imposed by a reasonable housing diameter, and thereby produces maximum neutron sensitivity. One gas-filled detector that has been found suitable for this use is 9¼" in length and 2½" in diameter.

In accordance with the invention the porosity resolution is increased by a neutron moderator 21 that is interposed within the housing 10 between the detector 17 and a plutonium-beryllium or americium-beryllium neutron source 22. The moderator 21 preferably is formed in a cylindrical shape that matches the internal transverse dimension of the housing 10. Acceptable materials for the moderator 21 include "reactor-grade" graphite, beryllium, or any suitable material such as polyethylene or polystyrene, in which fast neutrons are slowed down in a few energy-degrading collisions with the moderator nuclei to the same average kinetic energy as the medium in which the neutrons are undergoing this scattering. The moderator 21 reduces the number of neutrons that reach the detectors by way of the tool and the borehole, and thereby increases the formation dependency of the neutron detector signal.

The neutron source 22 is mounted in a recess formed in a fast neutron shield 23 adjacent to one side of the housing 10. Because the source 22 radiates fast neutrons with equal probability in all directions, or isotropically, and these neutrons have energies in the range from about 1 mev. to approximately 11 mev., the average energy being about 4–5 mev., the fast neutron shield 23 is formed of copper, or the like, to scatter the neutrons preferentially back toward the formation 13. A fast neutron shield of this sort is described in more complete detail in U.S. Pat. application Ser. No. 588,400 filed by Harold Sherman and Jay Tittman on Oct. 21, 1966 for "Epithermal Neutron Logging," and assigned to the assignee of the invention described herein.

By interposing the shield 23 between the source 22 and those portions of the housing 10 and borehole 12 that are not adjacent to the steel pipe 15, a portion of the neutrons which ordinarily would be wasted by transport through or absorption in the housing and the borehole environment are scattered or reflected back toward the portion of the formation 13 in the vicinity of the neutron source 22.

In this connection, it has been found that neutrons bombarding the formation 13 with initial energies in the 4–5 mev. range produce a detector response that is more representative of the formation porosity than neutrons of higher initial energy, as, for example, the 14 mev. neutrons that characterize certain types of netruon generator tubes. It seems that the neutron population pattern established by the higher energy neutrons reflects not only the porosity of the formation 13, but also to a large degree the matrix or mineral composition of the formation. Accordingly, it is preferable, although by no means essential to the practice of the invention, to use sources that produce neutrons in the aforementioned 4–5 mev. energy range.

Spaced vertically above the source 22, and in general alignment with the source, is a short-spaced neutron detector 25. The detector 25 also may be a four atmosphere $He^3$ device that has a transverse diameter which is substantially smaller than the inner diameter of the housing 10. Typically, the detector 25 may be 7¼" in length and 1¾" in diameter. Because the volume of the detector 25 is not as great as the volume of the detector 17, the short-spaced detector is less sensitive to neutrons than the long-spaced detector. This lower sensitivity compensates for the larger neutron population at the shorter distance, and thereby enables count rates of the two detectors to be in approximate balance. Naturally, other neutron detector equipment can be substituted for the detectors 17 and 25, for example, $He^3$ semiconductor detectors, and the like.

The vertical separations between the detectors 17 and 25 and the source 22 as indicated by the arrows S–D2 and S–D1, respectively, depend to a great extent on the strength of the source and the nature of the formation. The distances S–D1 and S–D2 as shown in FIG. 1 are measured from the geometric centers of the detectors and the source. Other reference points, for example, the distance between effective centers, or the distance between some common structural feature on the detector may be chosen for the purpose of separtion measurement. In any event, the separation between the source 22 and the effective center of the active volume of the long-spaced detector 17 must be greater than the distance between the source and the equivalent point in the detector 25. Thus, typical separation distances between geometric centers of about 20" to 29" have been found suitable for the detector 17, while distances of about 13" to 22" have been found satisfactory for the detector 25.

Interposed between the housing 10 and the surface of the detector tube 25 that is not adjacent to the housing 10 is a neutron absorbing shield 26 which may be formed of boron carbide ($B4C$) or the like.

Backup pads 27 and 30 are pivotally attached to a portion of the housing 10 that is diametrically opposite to the side that engages the steel casing 15, the source 22 and the detector 25. The backup pads 27 and 30 urge the housing toward the formation 13 in order to reduce the influence of the borehole 12 and drilling mud 14 on the neutron population registered by the detectors 17 and 25.

Signals that characterize the formation porosity are transmitted from the detectors 17 and 25 through the conductors 31 and 32, respectively, to a downhole signal transmission circuit 33. The conductor 31 associated with the neutron detector 17 is received in a bore 34 that is formed in the shields 21, 23 and 26. The transmission circuit 33 may be of the type that is described in more complete detail in U.S. Pat. application Ser. No. 570,068, filed by Stanley Locke, Harold Sherman and John S.

Wahl on Aug. 3, 1966 for "Measuring Apparatus and Method," and assigned to the assignee of the invention described herein.

Typically, transmission circuits of this sort may include pulse height discriminators, scaling circuits and amplifiers in order to transmit a signal that corresponds to the counts registered by the detectors 17 and 25 through conductors 35A and 35B, respectively, in the cable 11 to the apparatus 19 on the earth's surface.

The surface apparatus 19 may include amplifiers and pulse height discriminators as part of a computation circuit 36 that strikes a ratio between the neutron counts registered in the short-spaced detector 25 and the counts registered in the long-spaced detector 17, in the manner described more completely in the aforementioned Locke et al. patent application. This ratio, when combined with the diameter of the borehole 12 produces a signal that is principally a function of the porosity of the earth formation 13.

Because the overall separation between the detectors 17 and 25 can be more than 30", the detectors necessarily are not measuring the same portion of the earth formation 13 at the same time. Thus, without appropriate compensation, the signals from the detectors cannot be compared directly.

This discrepancy is overcome, when recording data as the housing 10 is drawn upwardly through the borehole 12, by providing a memory system 37 in the surface apparatus 19. The memory system stores the signal from the detector 25 transmitted through the conductor 35B for the time required to draw the detector 17 up the borehole 12 a distance equal to the separation between the measuring points within the formation for each of the detectors. Typically, the vertical position of the measuring point for the detector 17 is about one-half the distance S–D2, and the vertical location of the measuring point for the detector 25 is about one-half the distance S–D1.

The memory system can be paced by a measuring wheel and linkage associated with the armored cable 11 to adjust the signal storage time to match changes in the upward movement of the housing 10 through the borehole 12. In this manner, the detector signals applied to the computation circuit 36 are manipulated to correspond to the same position in the formation 13 in spite of the separation between the detectors 17 and 25.

Figure 2:
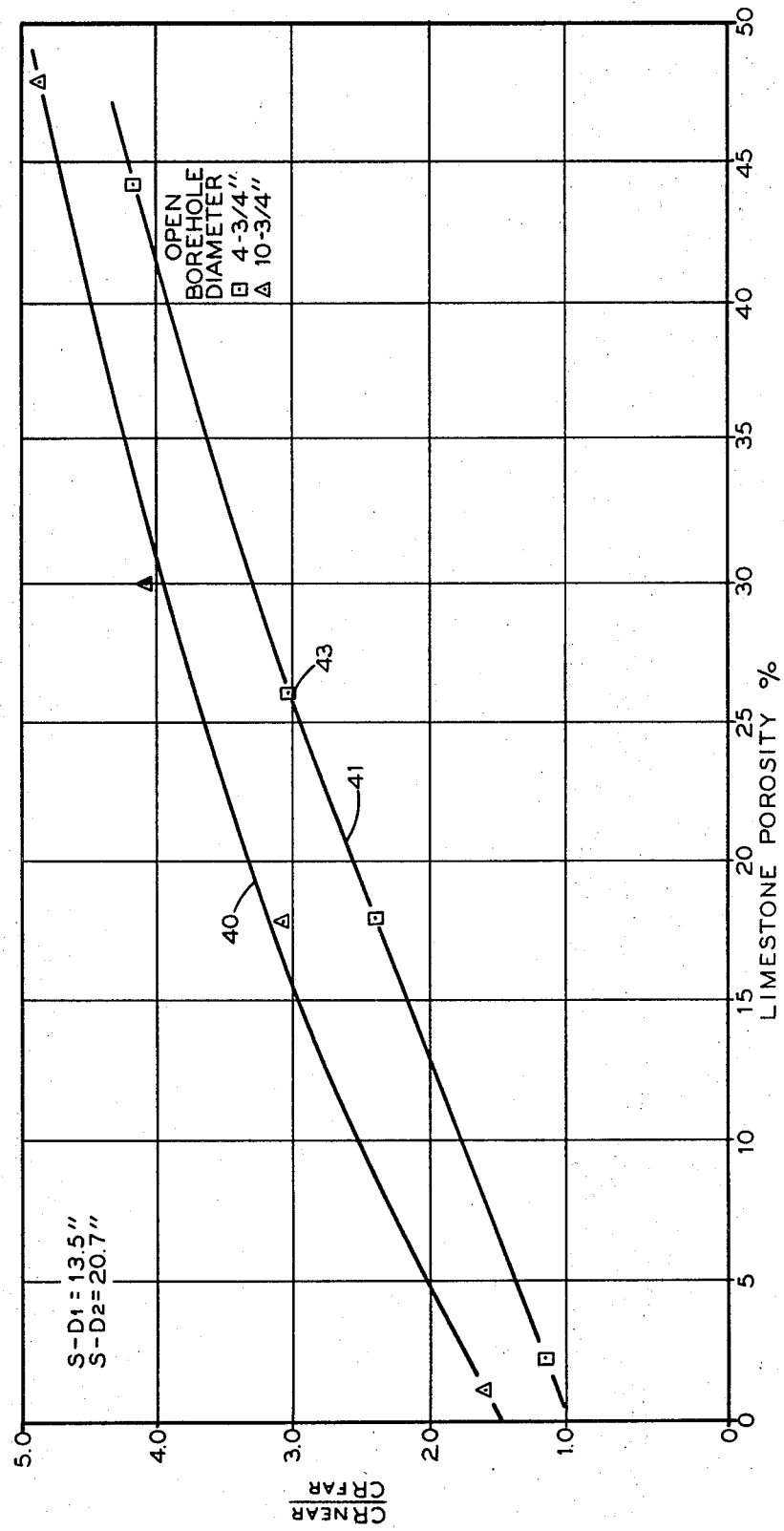
FIG. 2 is a graph of a typical circuit response in accordance with the invention.

In FIG. 2, a graph of the relation between a ratio of detector count rates and porosity for uncased borehole diameters of 10¾" and 4¾" in a limestone formation is shown by the curves 40 and 41, respectively. The data presented in FIG. 2, although illustrative of some of the features and advantages of the invention, was collected through a tool having a slightly different configuration and borehole environment than that which is shown in FIG. 1. The detector 25 in the tool providing the basis for the porosity measurements was not mounted eccentrically within the housing 10, but mounted on the axis of the tool.

Thus, for example, if the ratio of short-spaced ($CR_{near}$) and long-spaced ($CR_{far}$) detector count rates taken in a 4¾" diameter borehole is 3.0, a point 43 is identified on the curve 41. The point 43 indicates that the formation porosity is 26 percent. Similar curves or sets of data for different borehole diameters in other mineral structures can be developed through field experience and laboratory test formations. These data then can be applied to establish automatic formation porosity computation circuit responses for the circuits more completely described in the aforementioned Locke et al. patent application.

Figure 3:
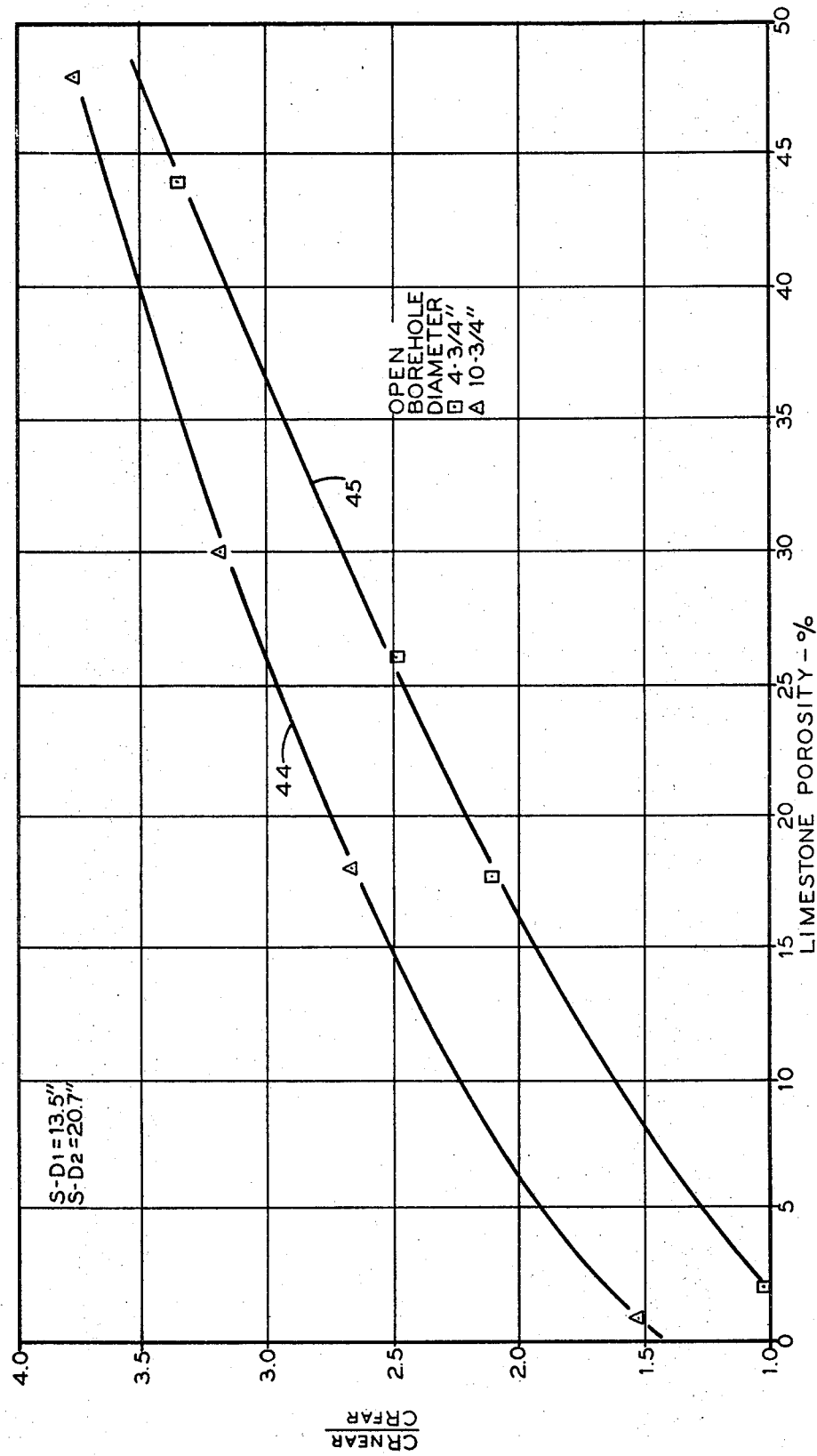
FIG. 3 is another graph of a typical circuit response, also characterizing some of the principles of the invention.

FIG. 3 is presented for the purposes of comparison. To produce FIG. 3 the same tool used to collect the data shown in FIG. 2 was rearranged so that the two detectors were not located on opposite sides of the source 22 but were placed on the same side of the source in general alignment with the vertical axis of the housing 10. In this condition, shielding was placed only beneath the short-spaced detector. The same limestone test formations as those used to develop FIG. 2 were logged with this rearranged detector configuration. FIG. 3 shows curves 44 and 45 that illustrate the relation between the ratio of detector counts and formation porosity for borehole diameters of 10¾" and 4¾", respectively, for this specific arrangement. As shown in FIG. 3, the lower portions of the curves are generally non-linear. This is particularly aggravated for porosities of less than 25 percent, which is the most frequently encountered practical condition. Non-linear curves of this character introduce automatic computation difficulties that can be solved only through a relatively lavish use of electrical components in contrast to circuits reproducing the linear response typified by FIG. 2.

The curves shown in FIG. 2, moreover, produce an improved tool response characteristic by reason of the relatively large change in detector counting rate ratio for a given difference in formation porosity relative to the curve shown in FIG. 3. The separation, moreover, between the curves 40 and 41 (FIG. 2) is less than the spread between the curves 44 and 45 (FIG. 3) at least in the low porosity range.

Of course, the embodiment of the invention shown in FIG. 1 can be modified further and still provide good results. For example, the housing 10 may be centered within the borehole 12. In this situation the backup pads 27 and 30 can be removed, while the source 22 and the detector 25 can be mounted in alignment with the vertical axis of the housing 10, as described in connection with FIG. 1. The boron carbide shield 26 would then be replaced by an aluminum centralizer, thereby permitting neutrons to enter the detector 25 from any side of the borehole.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. A borehole logging tool for measuring the porosity of an earth formation comprising a housing, a neutron source within said housing, a first neutron detector spaced from said neutron source on one side thereof, and a second neutron detector spaced from said source a distance at least equal to the distance occupied by said first detector and on another side of said source, said second detector being more sensitive to neutrons than said first detector.

2. A borehole logging tool according to claim 1 wherein said first detector and said source are adjacent to one side of said housing.

3. A borehole logging tool according to claim 1 comprising a neutron moderator interposed between said source and said second detector.

4. A tool for measuring the porosity of an earth formation traversed by a borehole comprising a housing, a source of neutrons having an average energy of about 4–5 mev. in said housing and abutting a side thereof, a fast neutron scattering shield interposed between said source and said housing, a neutron detector spaced from one end of said source and in alignment therewith to abut said side, a neutron detector more sensitive to neutrons than said aligned detector, spaced from the opposite end of said source a distance at least equal to the distance occupied by said aligned detector, a neutron moderator interposed between said more sensitive detector and said neutron source, and means for urging said source and said detectors toward the earth formation.

5. A tool according to claim 4 wherein said neutron moderator comprises beryllium.

6. A tool according to claim 4 wherein said neutron moderator comprises carbon.

7. A tool according to claim 4 wherein said neutron moderator comprises polyethylene.

References Cited

UNITED STATES PATENTS

| | | |
|---|---|---|
| 2,469,461 | 5/1949 | Russell. |
| 2,469,462 | 5/1949 | Russell. |
| 2,667,583 | 1/1954 | Herzog. |
| 2,674,699 | 4/1954 | Phillips. |
| 3,256,434 | 6/1966 | Carver et al. _____ 250—83.1 |

ARCHIE R. BORCHELT, Primary Examiner

U.S. Cl. X.R.

250—83.6